(12) United States Patent
Sengupta et al.

(10) Patent No.: US 11,164,376 B1
(45) Date of Patent: Nov. 2, 2021

(54) OBJECT MODELING USING LIGHT PROJECTION

(71) Applicant: Snap Inc., Santa Monica, CA (US)

(72) Inventors: Soumyadip Sengupta, Hyattsville, MD (US); Linjie Luo, Los Angeles, CA (US); Chen Cao, Los Angeles, CA (US); Menglei Chai, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 8 days.

(21) Appl. No.: 16/116,590

(22) Filed: Aug. 29, 2018

Related U.S. Application Data

(60) Provisional application No. 62/552,206, filed on Aug. 30, 2017.

(51) Int. Cl.
*G06K 9/00* (2006.01)
*G06T 17/30* (2006.01)

(52) U.S. Cl.
CPC .......... *G06T 17/30* (2013.01); *G06K 9/00208* (2013.01); *G06K 9/00248* (2013.01); *G06K 9/00281* (2013.01)

(58) Field of Classification Search
CPC .......... G06T 7/50; G06T 7/507; G06T 7/529; G06T 2207/30201; G06T 17/30; G06K 9/00281; G06K 9/00248; G06K 9/00208
USPC ........................................................ 382/118
See application file for complete search history.

(56) References Cited

U.S. PATENT DOCUMENTS

| | | |
|---|---|---|
| 5,754,939 A | 5/1998 | Herz et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |

(Continued)

FOREIGN PATENT DOCUMENTS

| | | |
|---|---|---|
| CA | 2887596 A1 | 7/2015 |
| WO | WO-2012000107 A1 | 1/2012 |

(Continued)

OTHER PUBLICATIONS

Patel, Ankur, and William AP Smith. "Driving 3D morphable models using shading cues." Pattern Recognition 45.5 (2012): 1993-2004. (Year: 2012).*

(Continued)

*Primary Examiner* — Shefali D Goradia
(74) *Attorney, Agent, or Firm* — Schwegman Lundberg & Woessner, P.A.

(57) ABSTRACT

A shape generation system can generate a three-dimensional (3D) model of an object from a two-dimensional (2D) image of the object by projecting vectors onto light cones created from the 2D image. The projected vectors can be used to more accurately create the 3D model of the object based on image element (e.g., pixel) values of the image.

20 Claims, 17 Drawing Sheets

(56) References Cited

U.S. PATENT DOCUMENTS

| | | |
|---|---|---|
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |

(56) References Cited

FOREIGN PATENT DOCUMENTS

| WO | WO-2017176992 A1 | 10/2017 |
|---|---|---|
| WO | WO-2018005644 A1 | 1/2018 |

OTHER PUBLICATIONS

Worthington, Philip L., and Edwin R. Hancock. "New constraints on data-closeness and needle map consistency for shape-from-shading." IEEE Transactions on Pattern Analysis and Machine Intelligence 21.12 (1999): 1250-1267. (Year: 1999).*

Blanz, Volker, et al. "Face recognition based on frontal views generated from non-frontal images." 2005 IEEE Computer Society Conference on Computer Vision and Pattern Recognition (CVPR'05). vol. 2. IEEE, 2005. (Year: 2005).*

Paysan, Pascal, et al. "A 3D face model for pose and illumination invariant face recognition." 2009 Sixth IEEE International Conference on Advanced Video and Signal Based Surveillance, Ieee, 2009. (Year: 2009).*

Lourakis, Manolis IA. "A Brief Description of the Levenberg-Marquardt Algorithm Implemened by Ievmar." (2005). (Year: 2005).*

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

* cited by examiner

GROUND TRUTH

MEAN SHAPE

BASELINE

REFINED

OBJECT MODELING USING LIGHT PROJECTION

PRIORITY CLAIM

This application claims the benefit of priority of U.S. Provisional Application Ser. No. 62/552,206, filed on Aug. 30, 2107, which is hereby incorporated by reference herein in its entirety.

TECHNICAL FIELD

The present disclosure generally relates to the technical field of special-purpose machines that perform image processing and improvements to such variants, and to the technologies by which such special-purpose machines become improved compared to other special-purpose machines for performing object modeling.

BACKGROUND

It is difficult for computers to determine a three-dimensional (3D) shape from a two-dimensional (2D) depiction of the shape (e.g., to determine a 3D shape of a human face from a 2D image of the face). Conventional approaches configured to convert a 2D image of a shape into a 3D model of the shape yield inaccurate 3D models.

BRIEF DESCRIPTION OF THE DRAWINGS

To easily identify the discussion of any particular element or act, the most significant digit or digits in a reference number refer to the FIG. number in which that element or act is first introduced.

DETAILED DESCRIPTION

Figure 1:
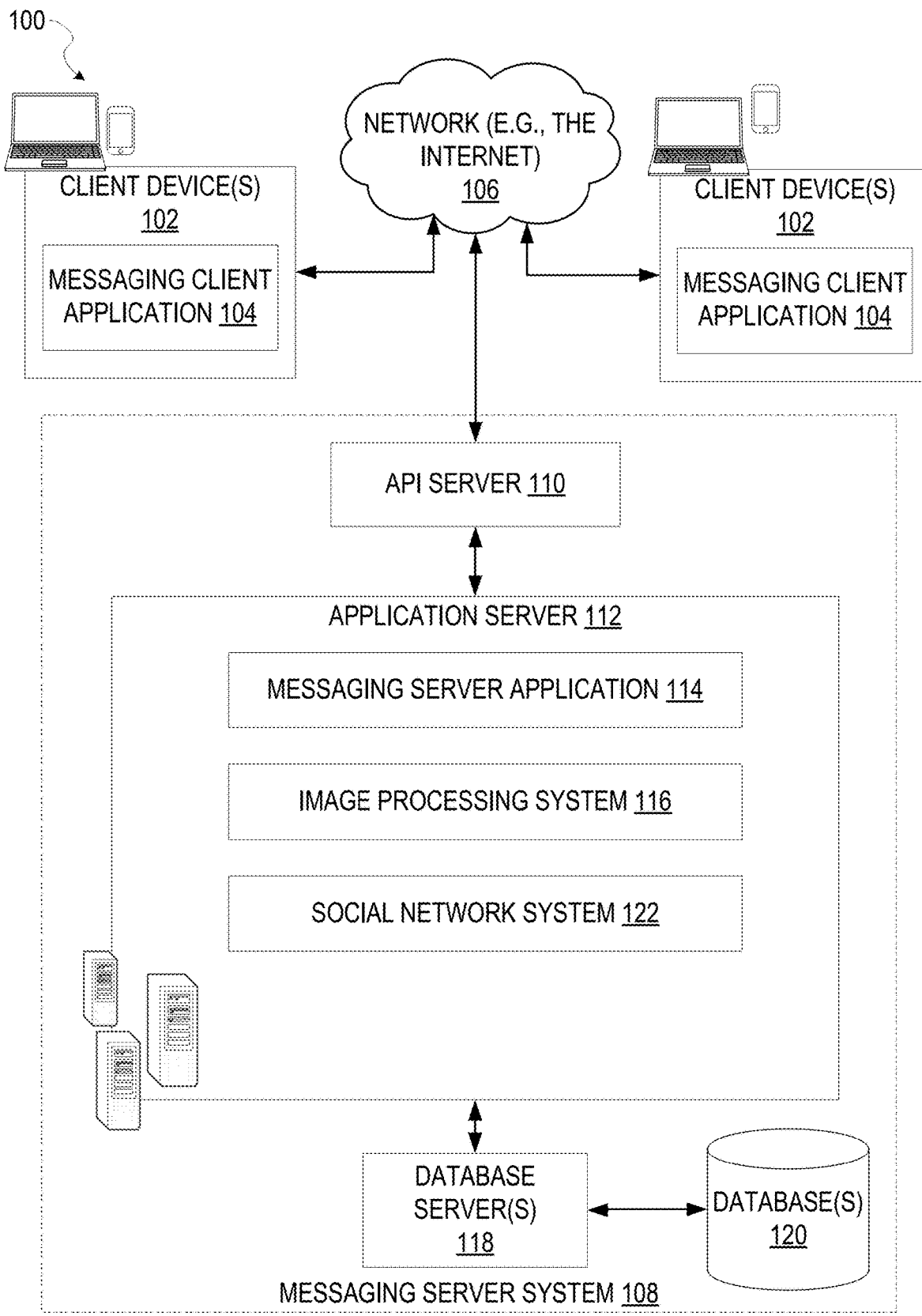
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some conventional approaches for generating a 3D model of a shape from a 2D depiction of the shape use a mean or average shape model to provide normalization vectors normal to the surface of the mean shape. The normalization vectors are used to generate a 3D model of the shape from the 2D depiction of the shape. The mean shape model is a generalized 3D shape model created by averaging a large set of shape models. For example, a mean shape model of a face can be generated by averaging together a large set of face shape models. These approaches generally only yield satisfactory results if the shape being converted is similar in appearance to the mean shape model. If a shape to be modeled in 3D from a 2D depiction is not similar to the mean shape, the 3D model generated using the mean shape will be inaccurate.

To this end, in a first iteration, an initial 3D model of a shape is created from a 2D image of the shape using a mean shape model approach, according to some example embodiments. For instance, an initial 3D model of a person's face is initially created from a 2D depiction of the person's face using the mean shape model approach. Although faces are the shapes discussed herein as an example, it is appreciated that 3D models of other shapes (e.g., a human hand, a dog's face, an airplane) can be generated in a similar manner. Continuing, the normal vectors used in the shape creation process can be the ground-truth vectors, such as normal vectors from an actual person's face or model of the face. In some example embodiments, in practice (e.g., runtime), the ground-truth shape is unknown and the only data available is often a gray-scale image or color image of the person's face. While the ground-truth 3D model is unknown, lighting data from the image is known from pixel values of the image. Light cones that approximate the position of the ground-truth normal can be generated for each pixel according to each pixel's value (e.g., magnitude). The angle and shape of the light cone model light rays emanating from a given point, e.g., a point spread function. To refine the light rays, the mean shape normal vector is projected (e.g., by a dot product) onto the nearest part of the light cone. The projected vectors can then be used to create an updated normalization factor (e.g., Nref), which is then used to create a more accurate 3D shape model of an imaged person's face.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). In various embodiments, virtual machine learning can be used by the messaging client application 104 and/or an image processing system 116 to analyze images sent within the messaging system 100 and to use this analysis to provide features within the messaging system 100.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, include functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, image search data, social network information, and live event information, as examples, some of which rely on information generated by analyzing images sent through the messaging system 100. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112. In some embodiments, databases 120 may also store results of image processing or details of various trained and untrained support vector machines that may be used by the messaging server system 108.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the addition and deletion of friends to and from a social graph; the location of friends within the social graph; and application events (e.g., relating to the messaging client application 104).

The application server 112 hosts a number of applications and subsystems, including the messaging server application 114, the image processing system 116, and a social network system 122, according to some example embodiments. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., an entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The application server 112 is communicatively coupled to a database server 118, which facilitates access to a database 120 in which is stored data associated with messages processed by the messaging server application 114.

Figure 2:
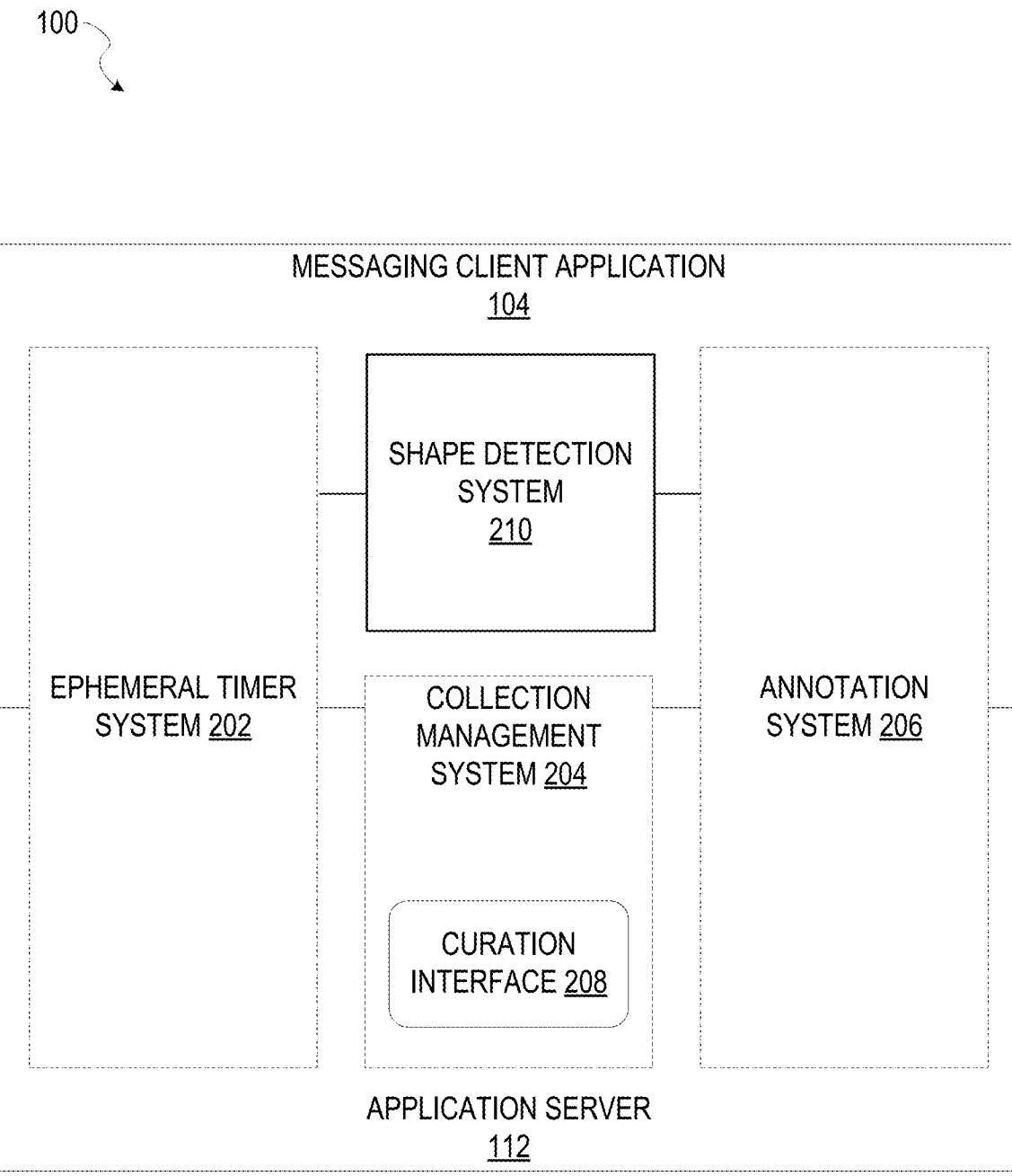
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a shape detection system 210.

The ephemeral timer system 202 is responsible for enforcing the temporary access to content permitted by the messaging client application 104 and the messaging server application 112. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time The shape detection system 210 is configured to generate increased-accuracy 3D shapes from 2D images of objects, as discussed in further detail below.

Figure 3:
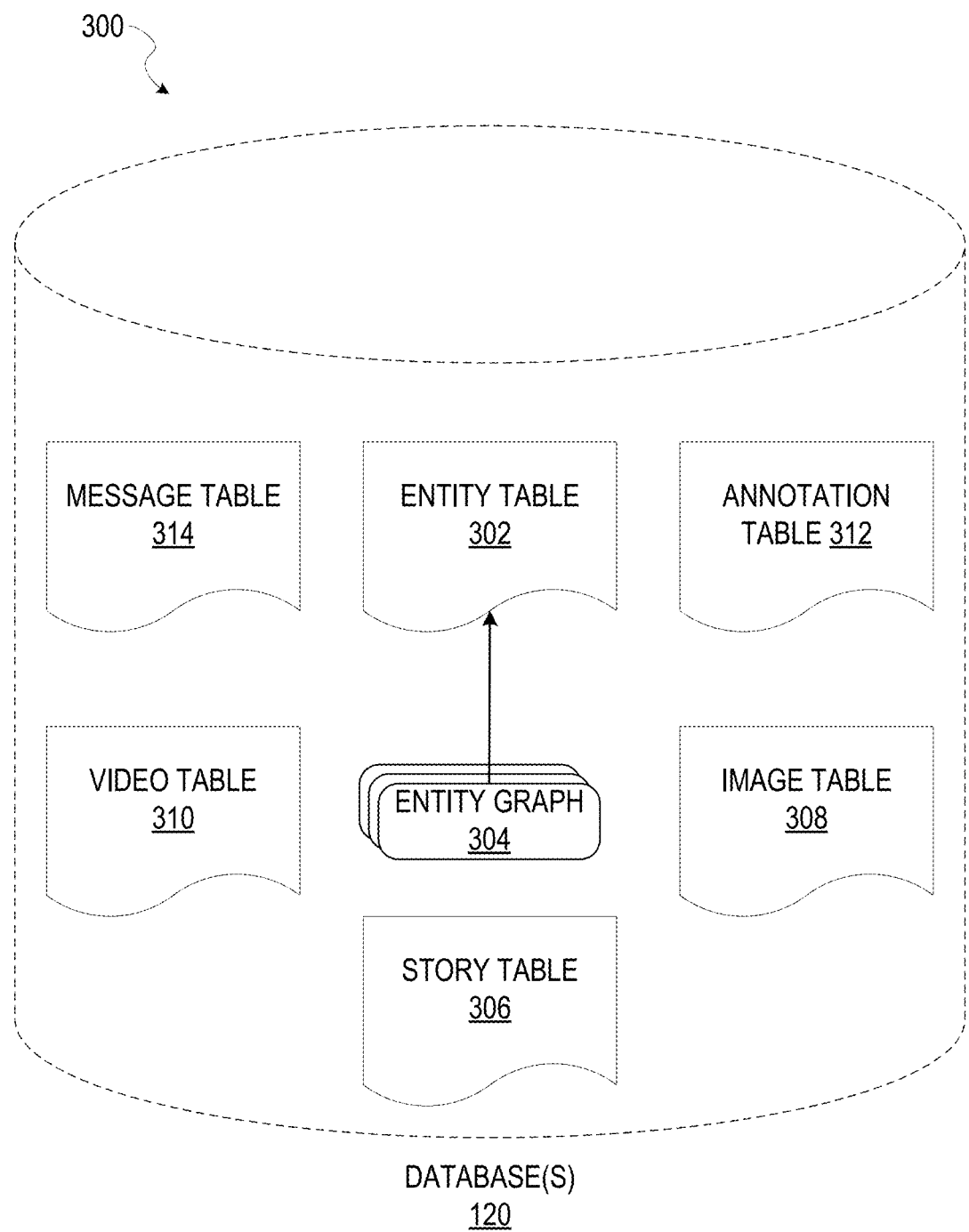
FIG. 3 is a schematic diagram illustrating data that may be stored in a database of a messaging server system, according to certain example embodiments.

FIG. 3 is a schematic diagram illustrating data 300, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Merely for example, such relationships may be social, professional (e.g., work at a common corporation or organization), interest-based, or activity-based.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
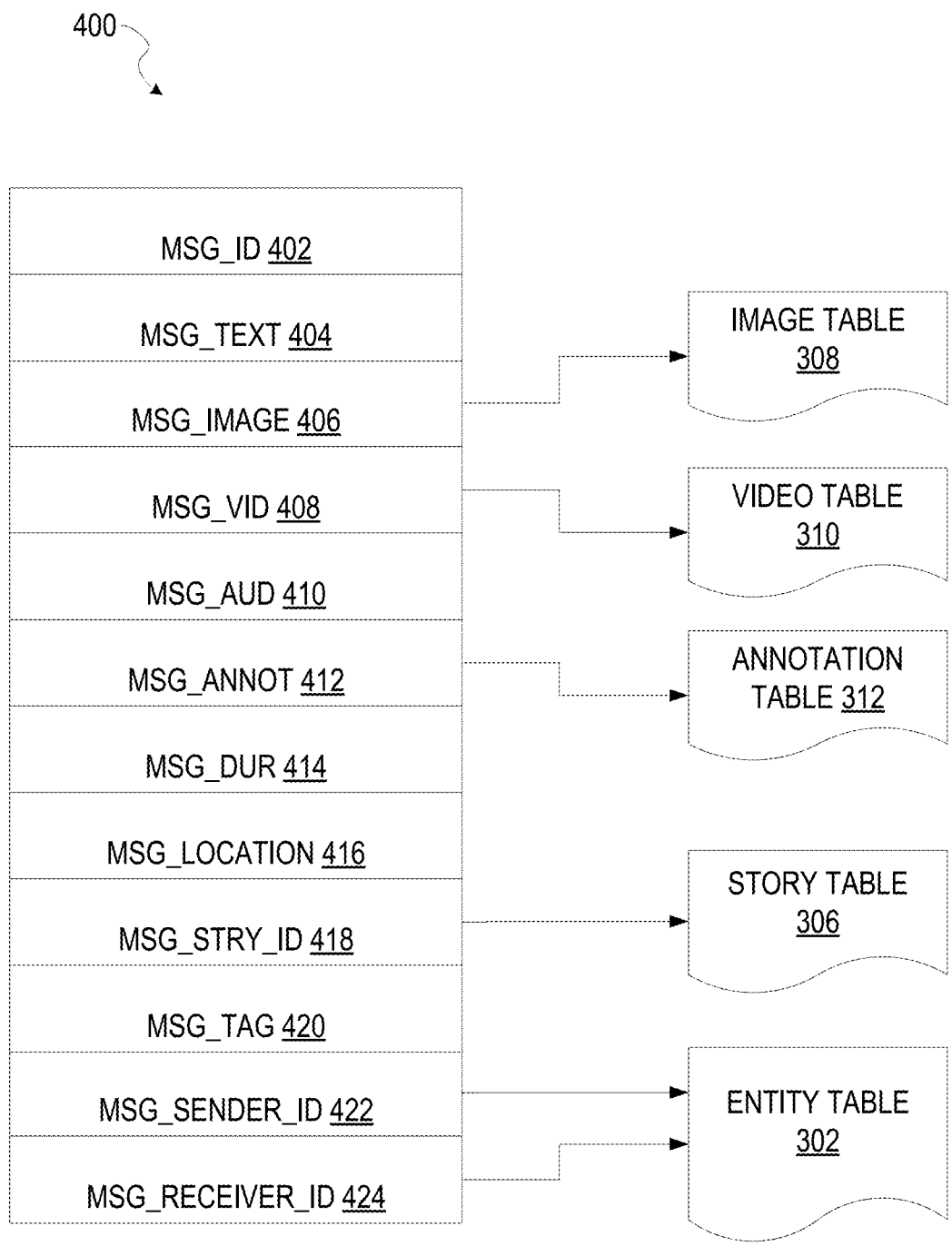
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
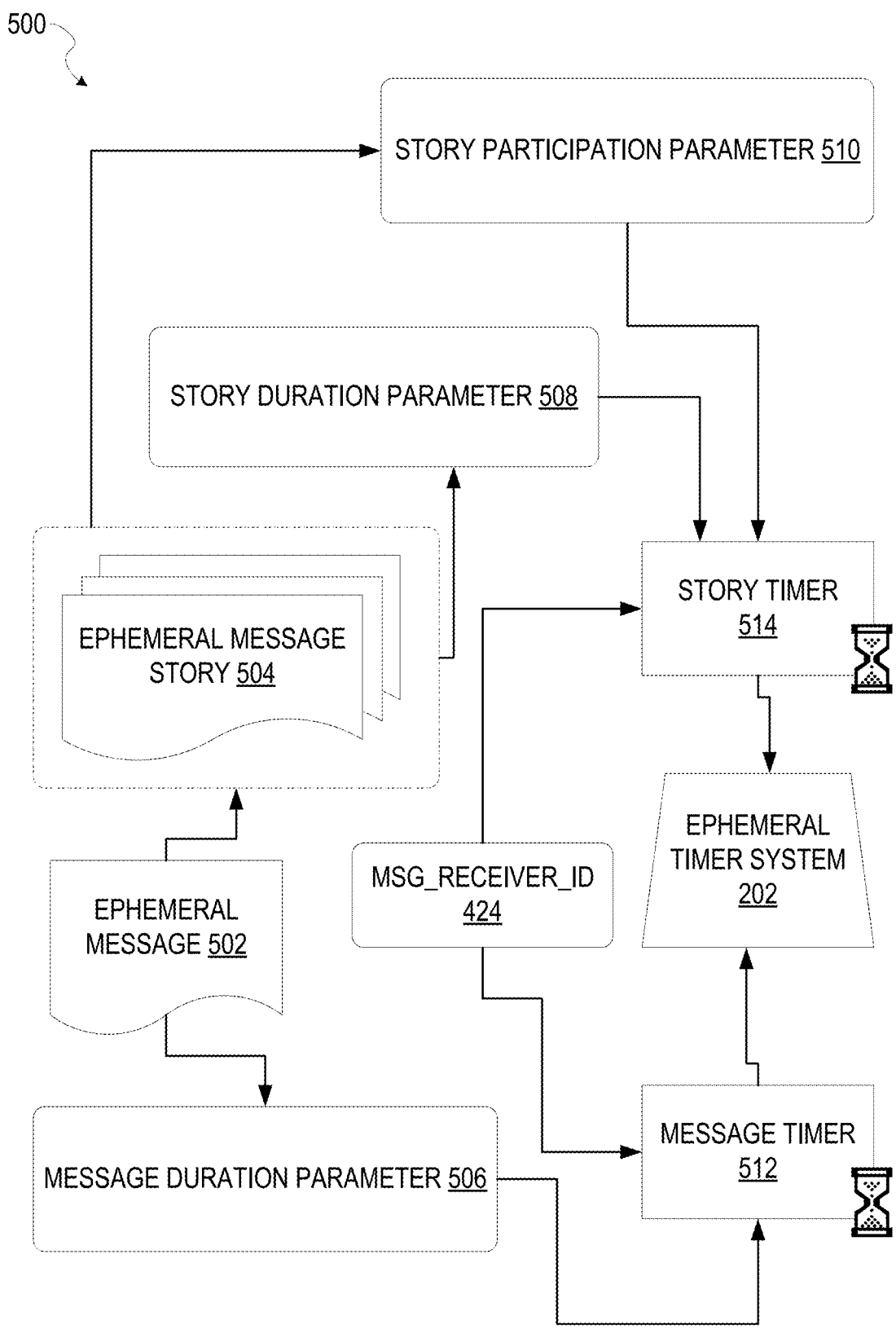
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
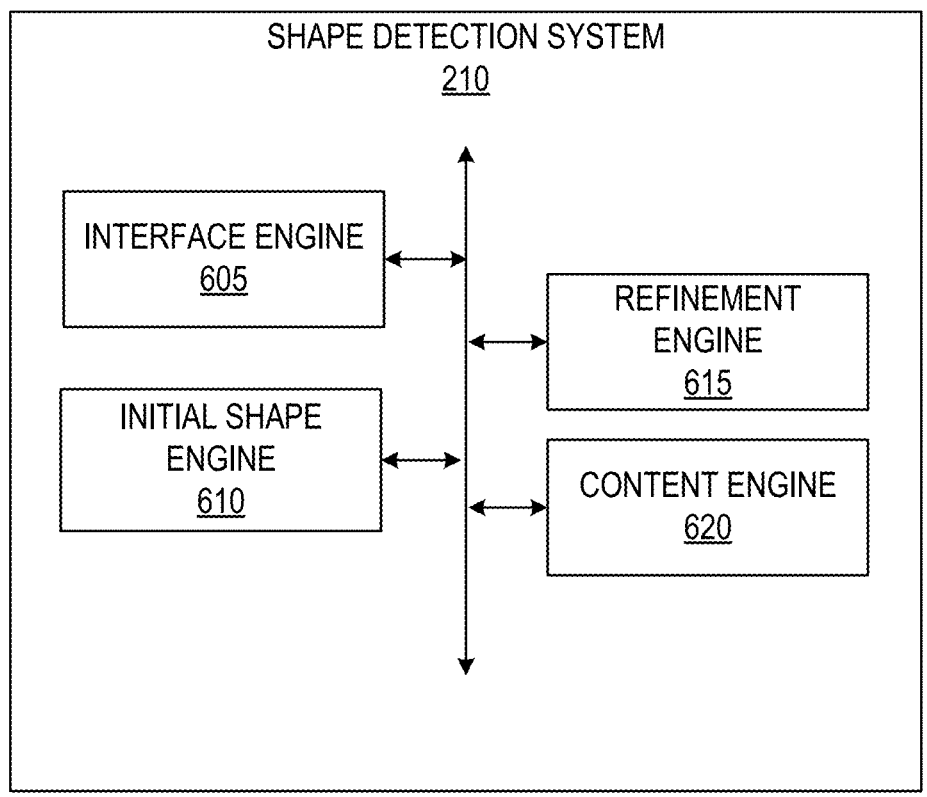
FIG. 6 shows example internal functional components of a shape detection system, according to some example embodiments.

FIG. 6 shows example internal functional components of a shape detection system 210, according to some example embodiments. As illustrated, the shape detection system 210 includes an interface engine 605, an initial shape engine 610, a refinement engine 615, and a content engine 620. The interface engine 605 is configured to manage generation of images used for face detection. For example, the interface engine 605 can detect a live video feed being displayed on a screen of a client device (e.g., client device 102) and sample one or more images for 3D model shape generation. The initial shape engine 610 is configured to generate an initial 3D shape model of the face depicted in the image captured by the interface engine 605. The refinement engine 615 manages projecting vectors onto light cones using pixel data from the image to generate a more accurate 3D model of the face depicted in the image. The content engine 620 is configured to apply one or more image effects to the depicted face using the generated 3D shape model of the face.

Figure 7:
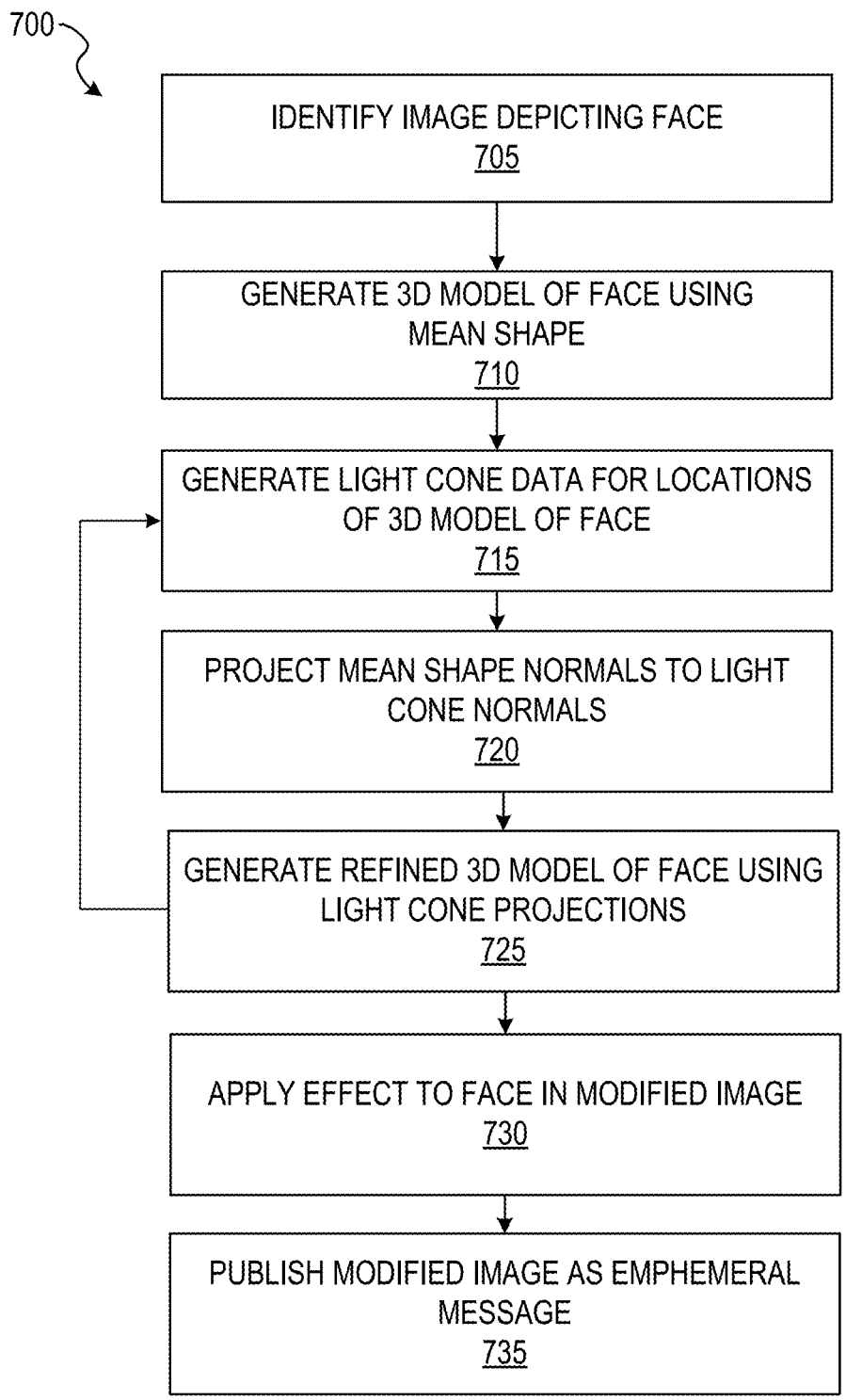
FIG. 7 shows a flow diagram for a method for generating accurate 3D shape models from an image of a shape using light cone projections, according to some example embodiments.

FIG. 7 shows a flow diagram of a method 700 for generating accurate 3D shape models from an image of a shape using light cone projections, according to some example embodiments. At operation 705, the interface engine 605 identifies an image depicting a face shape. For example, a live video feed may be displayed on a display screen of the client device 102, and the interface engine 605 may sample an image depicting a face from the live video feed.

At operation 710, the initial shape engine 610 generates a 3D model of the face depicted in the image using a mean shape in a shape normalization factor approach. For example, the 3D model of the face can be generated by minimizing the following:

$$\min_{\rho, l_0, l, z} \sum_{x,y} [I(x, y) - \rho(x, y)(l_0 + l^T n(x, y))] + \lambda E_{reg}(z, z_{MS}) \quad [\text{Eq. 1}]$$

where I(x,y) is a coordinate pixel of the image, $\rho$ is the albedo of the coordinate pixel, $l_0$ is ambient light for the coordinate pixel, $l^T$ is a three-dimensional vector corresponding to the light ray for the coordinate pixel, n(x,y) is the normal for the pixel coordinate, $\lambda$ is an optimization parameter, $E_{reg}$ is the regularization with respect to the mean shape (MS), z is depth, and $z_{MS}$ is depth for the mean shape aligned to the modeled face. In minimizing Equation 1, n(x,y) can be solved for using a normalization factor Nref (x,y), where:

$$n(x, y) = \frac{[z(x, y) - z(x+1, y), z(x, y) - z(x, y+1), -1]}{Nref(x, y)} \quad [\text{Eq. 2}]$$

The normalization factor is a variable which makes the equations nonlinear and difficult to accurately solve. The normalization factor for a given coordinate pixel can be set to the mean shape normal vector; however, as discussed above, doing so can result in an inaccurate shape model because the face being depicted may not be visually similar to the mean face shape (e.g., the mean face shape is narrow and nearly symmetrical and many faces are neither narrow nor symmetrical). The normalization factor for a given coordinate pixel can be generated from the ground truth (e.g., the actual 3D shape of the human face, or a 3D model set as the ground truth or most accurate version of a given shape). However, at runtime, frequently all that is known is a two-dimensional image; therefore, the ground-truth shape is not available. When the ground truth shape is not available, the normal vectors can be approximated by assuming that, for a given coordinate point, a normal vector lies somewhere within a light cone (e.g., point spread function) that describes light emanating from the given coordinate point.

Returning to the method 700, at operation 715, the refinement engine 615 generates light cone data for locations (pixels) of the 3D model of the face. The shape and size of the light cone for a given pixel may depend on the value of the pixel (e.g., magnitude), which dictates how a point spread function emanates (e.g., the angle, attenuation, etc.).

Figure 8:
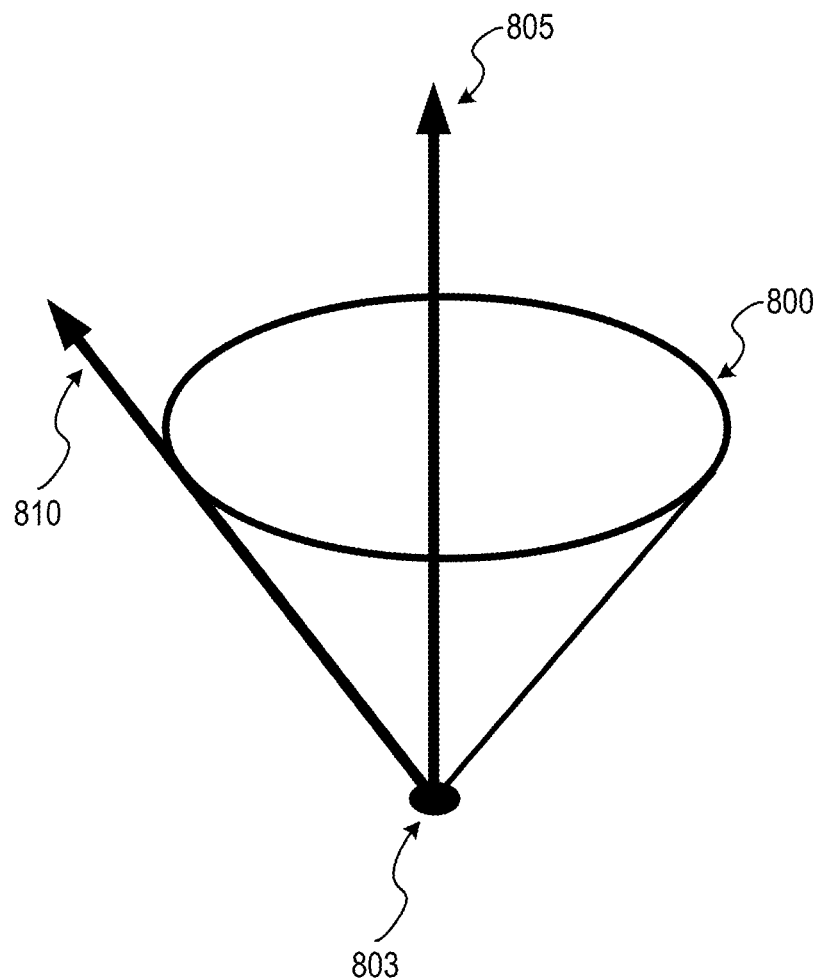
FIG. 8 shows an example light cone from a point, according to some example embodiments.

Jumping to FIG. 8, FIG. 8 shows an example light cone 800 from a point 803, according to some example embodiments. A light ray vector 805 is normal to a surface (not depicted) upon which the point 803 lies. The light cone 800 corresponds to a point spread function of light emanating from the point 803, vector 810 is at the limit or border of the light code 800. The rate of attenuation and the angle of the light cone depend upon the pixel value of the point 803.

Figure 9:
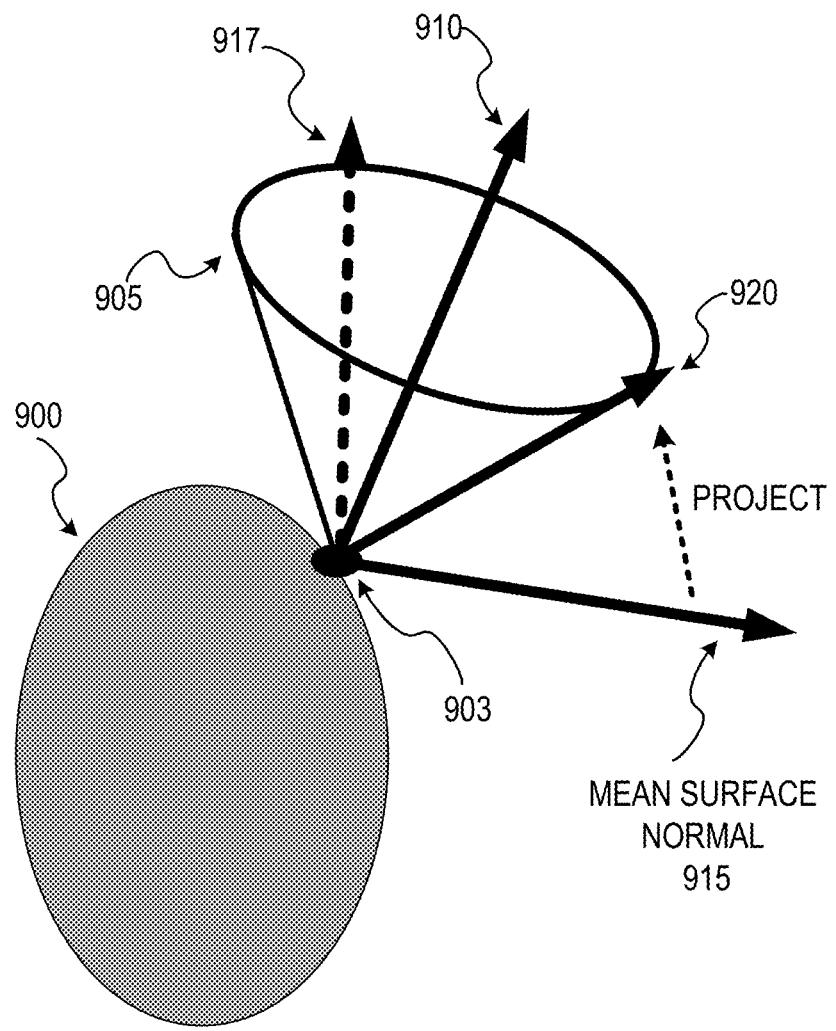
FIG. 9 shows an example light cone projection, according to some example embodiments.

Returning to FIG. 7, at operation 720, the refinement engine 615 projects mean shape normal vectors from each point to a light cone for each point. Jumping to FIG. 9, FIG. 9 shows a surface 900 on which a point 903 lies. A light cone 905 emanates from the point 903, where a light vector 910 (e.g., a ray) is the central axis of the light cone 905. As discussed above, if a mean surface normal vector 915 is used to solve the normalization factor (e.g., Nref in Equation 2), an inaccurate 3D shape model can result if the surface 900 is not similar to the mean shape. While the ground-truth normal vector for the point 903 is not known (because the actual 3D shape of the face is unknown), it is assumed that the ground-truth normal vector lies somewhere in the light cone 905, which includes various possible points for light emanating from the point 903. As such, a normal vector from the light cone 905 can be used to yield the normalization factor. In some example embodiments, a normal vector 920 in the light cone 905 that is closest to the mean surface normal vector 915 is selected to generate the normalization factor. That is, while other normal vectors on the light cone 905, such as a normal vector 917, may be used as an approximation for the ground truth, one of the most accurate vectors to use within the light cone 905 is the normal vector 920 that lies closest to the mean surface normal vector 915.

The mean surface normal vector 915 can effectively be projected onto the light cone 905 to determine the normal vector 920 by taking the cross product of the light vector 910 and the mean surface normal vector 915. The cross product can generate a plane which intersects the light cone 905 twice, and the intersection that is closer to the mean surface normal vector 915 is selected as the projected normal vector 920.

Analytically, the process is performed thus:

$$I(x,y) = \rho(x,y) l^T N(x,y) = \rho \cos \theta \quad [\text{Eq. 3}]$$

where I(x,y) is a point on the image, $\rho(x, y)$ is the albedo for the point, $l^T$ is light rays, N(x,y) is the normal for the point, and $\theta$ is the light cone half-angle (i.e., $2\theta$ is the full aperture of the light cone). Solving for $\theta$:

$$\theta = \cos^{-1}(I(x,y)/\rho(x,y)) \quad [\text{Eq. 4}]$$

The angle $\beta$ between the light vector 910 and the mean surface normal vector 915 is:

$$\beta = \cos^{-1}(l^T n_{MS}(x,y)) \quad [\text{Eq. 5}]$$

To yield the projected normal vector 920, rotate $n_{MS}$ by angle $\beta - \theta$ about an axis yielded by the cross product $n_{MS} \times l$ (where l is the light vector 910). Once the projected normal vector 920 is generated, a refined normalization factor, Nref, is generated using the projected normal vector 920 as the normal vector.

For each point on the surface 900, the mean surface normal for that point is projected onto a normal vector of a light cone that emanates from that given point. Returning to FIG. 7, at operation 725, the refinement engine 615 generates a refined 3D model of the face using the normal vectors (e.g., the normal vector 920) as projected on their respective light cones (e.g., the light cone 905) using a mean shape vector for the point (e.g., the mean surface normal vector 915).

After operation 725, optionally, one or more iterations may be performed by looping through operations 715, 720, and 725. In each iteration, the mean shape normal vector for a given point is projected onto the light cone for the given point, thereby creating an increasingly refined 3D model of the face in each iteration.

At operation 730, the content engine 620 applies one or more effects to the face using the refined 3D model of the face that describes the 3D shape of the face. At operation 735, the content engine 620 publishes a modified image as an ephemeral message (e.g., ephemeral message 502) on a social media network, as discussed above.

Figure 10A:
FIGS. 10A-10D show example 3D shapes, according to some example embodiments.
Figure 10B:
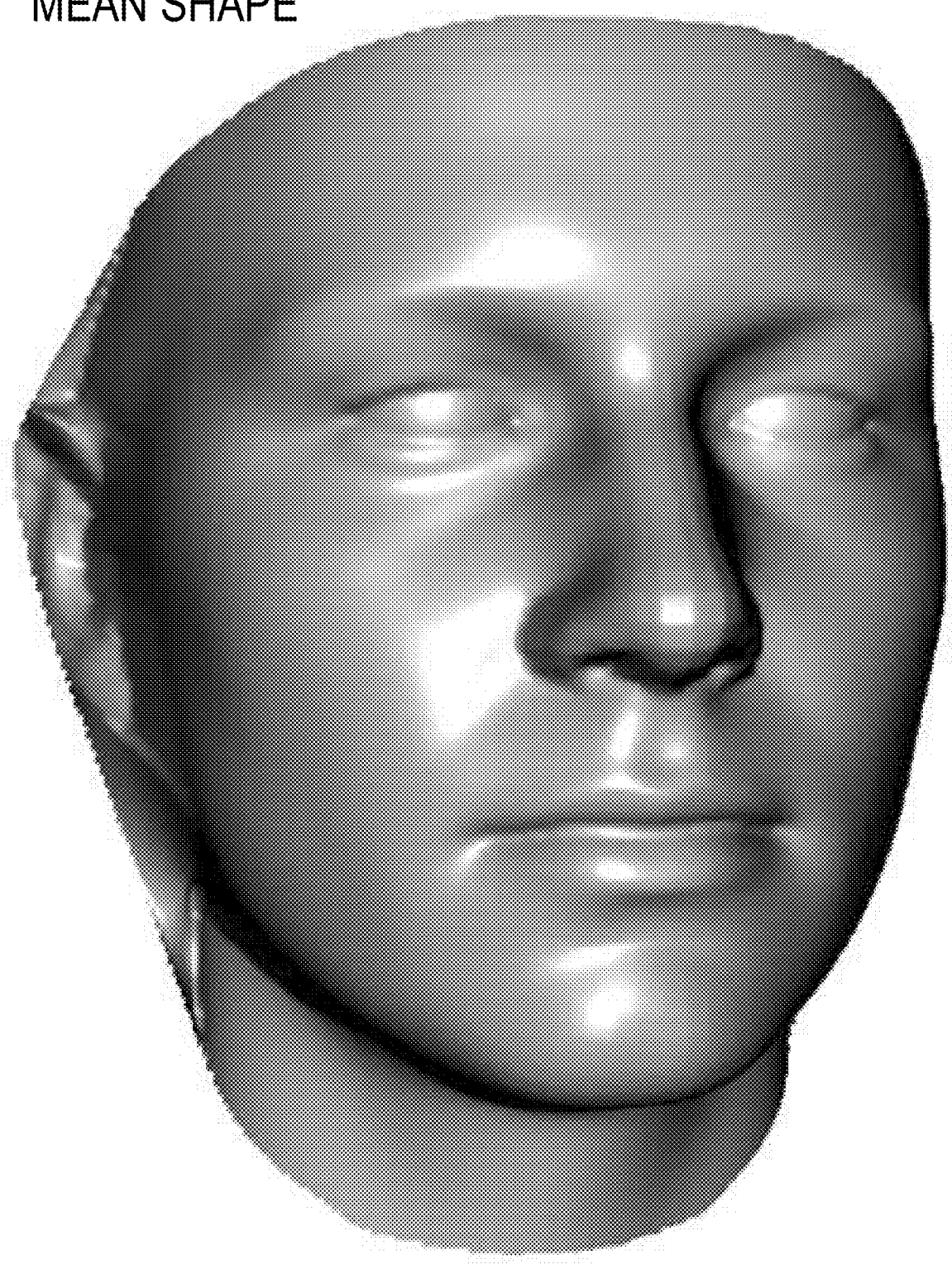
Figure 10C:
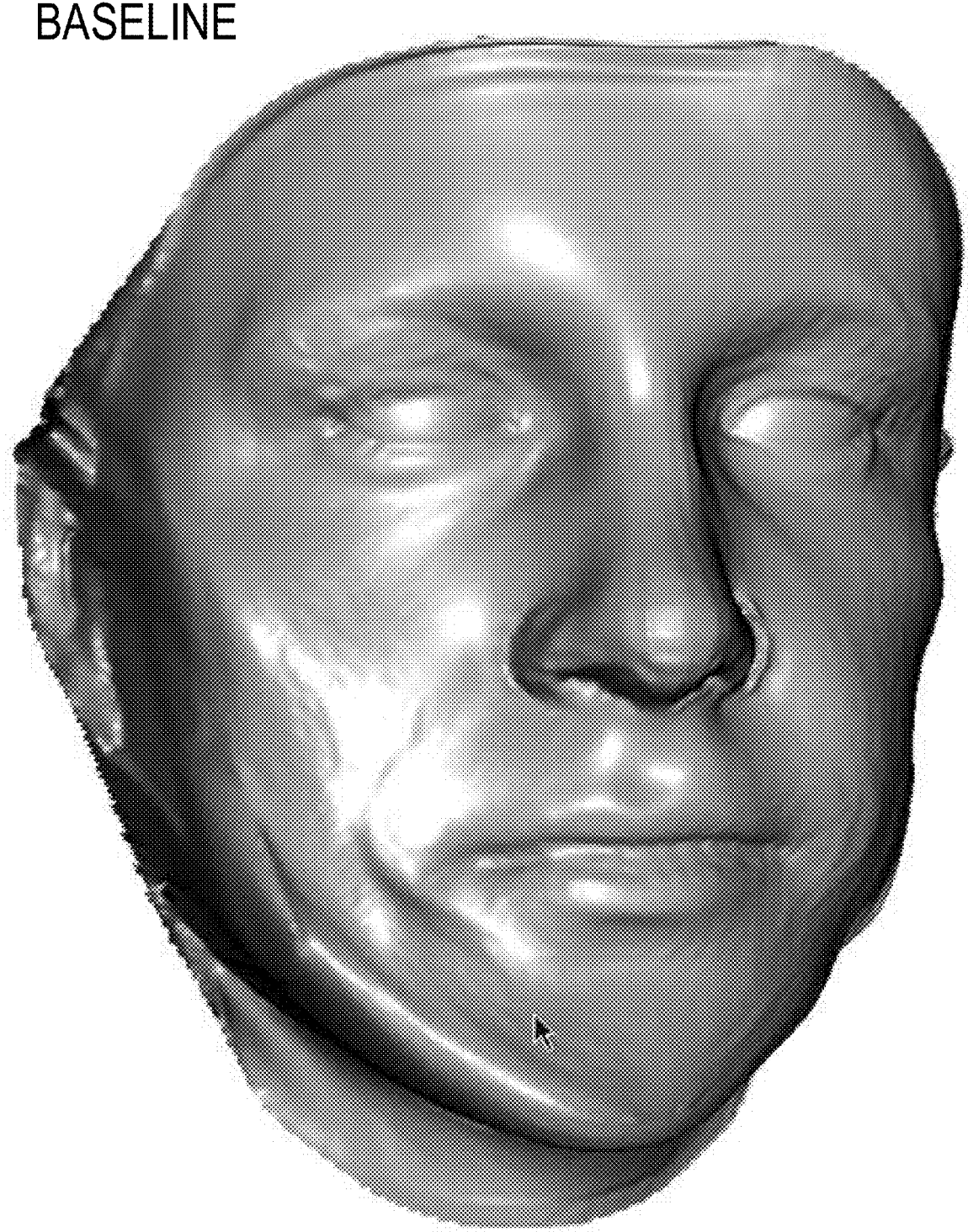
Figure 10D:
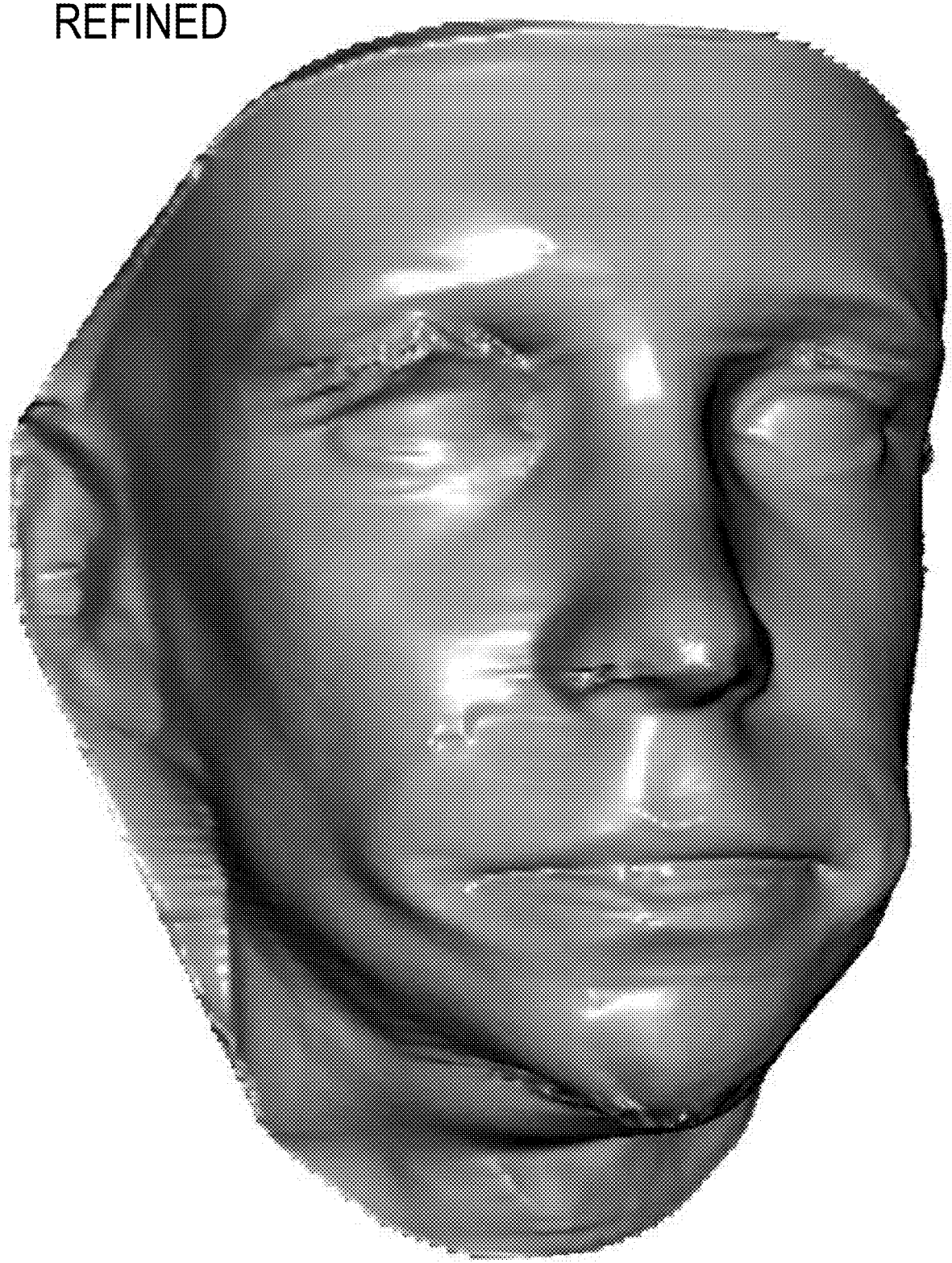

FIG. 10A shows an example ground-truth shape of a face (e.g., an accurate shape of a real person's face). FIG. 10B shows an example mean shape generated by averaging 3D model faces. FIG. 10C shows an example initial shape generated using the mean face shape of FIG. 10B. The example initial shape of FIG. 10C is an example output of operation 710. FIG. 10D shows an example refined shape created by projecting mean shape normal vectors onto their corresponding light cones as discussed above.

Figure 11A:
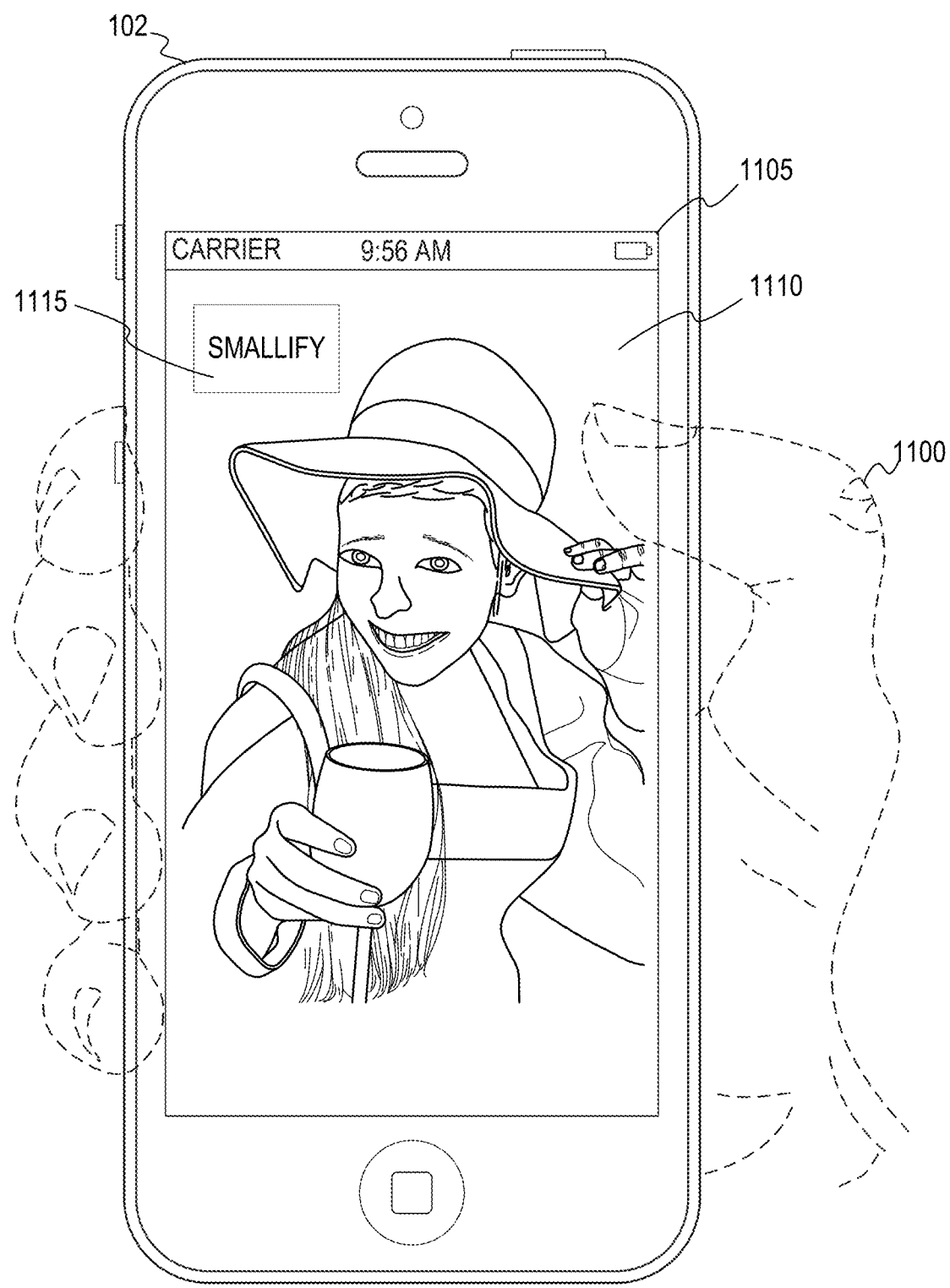
FIGS. 11A and 11B show example user interfaces for implementing shape detection using light cones, according to some example embodiments.
Figure 11B:
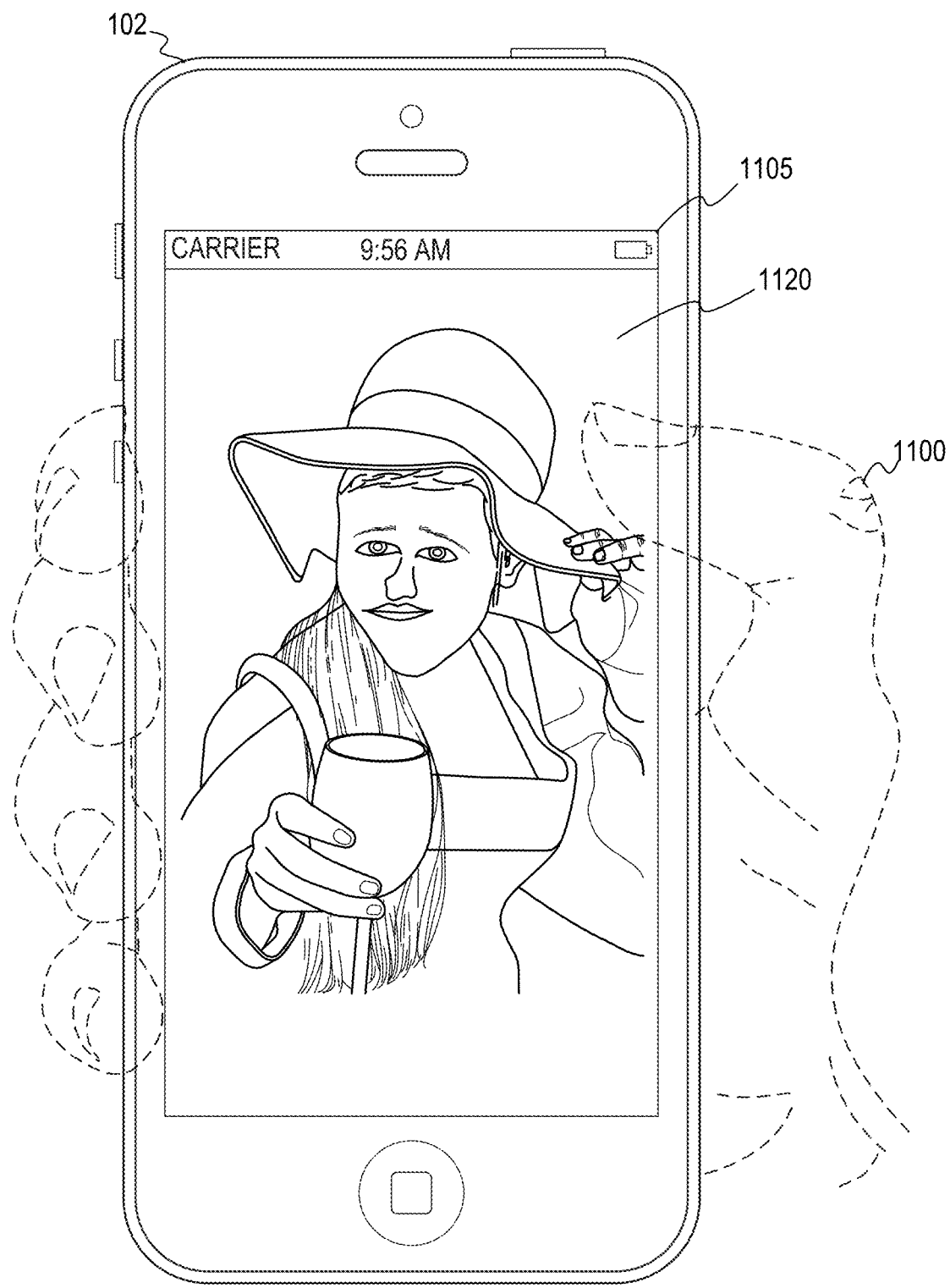

FIGS. 11A and 11B show example user interfaces for implementing shape detection using light cones, according to some example embodiments. In FIG. 11A, a user 1100 is holding a client device 102 comprising a user interface 1105 that depicts an image 1110 of a smiling girl wearing a hat. The user 1100 can initiate one or more operations of the method 700 by selecting a user interface element 1115 (e.g., a button) that is configured to apply a silly image effect on the image 1110. Turning to FIG. 11B, in response to the user 1100 selecting the user interface element 1115, the shape detection system 210 implements one or more operations of the method 700 to generate a modified image 1120 which shows features of the girl's face changed and grouped closer together. In particular, for example, the shape detection system 210 generates an initial 3D model (e.g., baseline model) of the girl's face using a mean shape model, then generates an updated 3D model of the girl's face by projecting normal vectors onto light cones. The updated 3D model of the girl's face can then be used to map the image 1110 as a texture on the updated 3D model, which can then be changed and rendered as the modified image 1120. The modified image 1120 can then be published as an ephemeral message (e.g., ephemeral message 502) on a network site (e.g., social media site), as discussed above.

Figure 12:
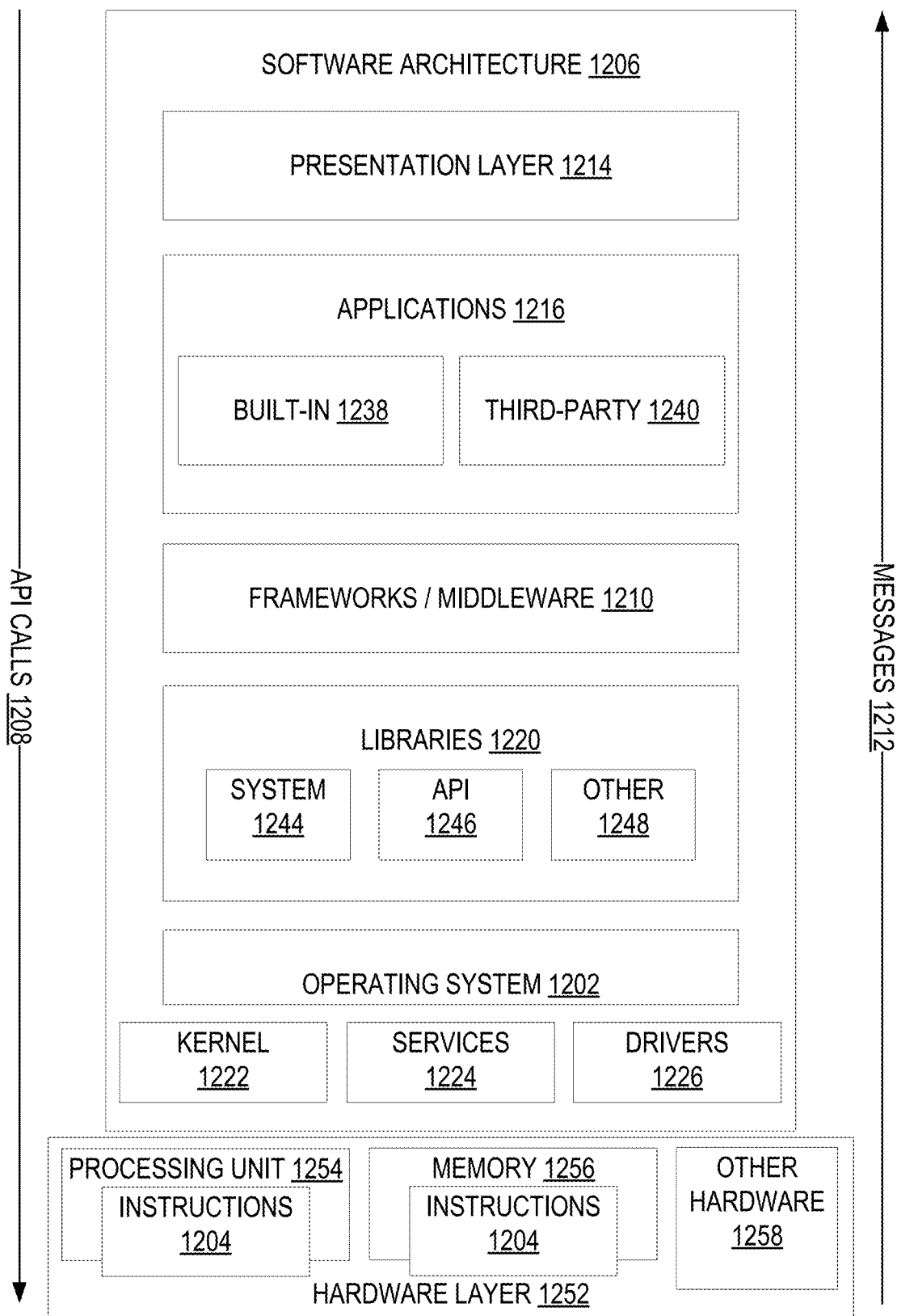
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors 1310, memory 1330, and I/O components 1350. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage modules 1256, which also have the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1210, applications 1216, and a presentation layer 1214. Operationally, the applications 1216 and/or other components within the layers may invoke API calls 1208 through the software stack and receive a response in the form of messages 1212. The layers illustrated are representative in nature, and not all software architectures have all layers. For example, some mobile or special-purpose operating systems may not provide a frameworks/middleware 1210, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1210 provide a higher-level common infrastructure that may be used by the applications 1216 and/or other software components/modules. For example, the frameworks/middleware 1210 may provide various graphic user interface (GUI) functions, high-level resource management, high-level location services, and so forth. The frameworks/middleware 1210 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1210 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Figure 13:
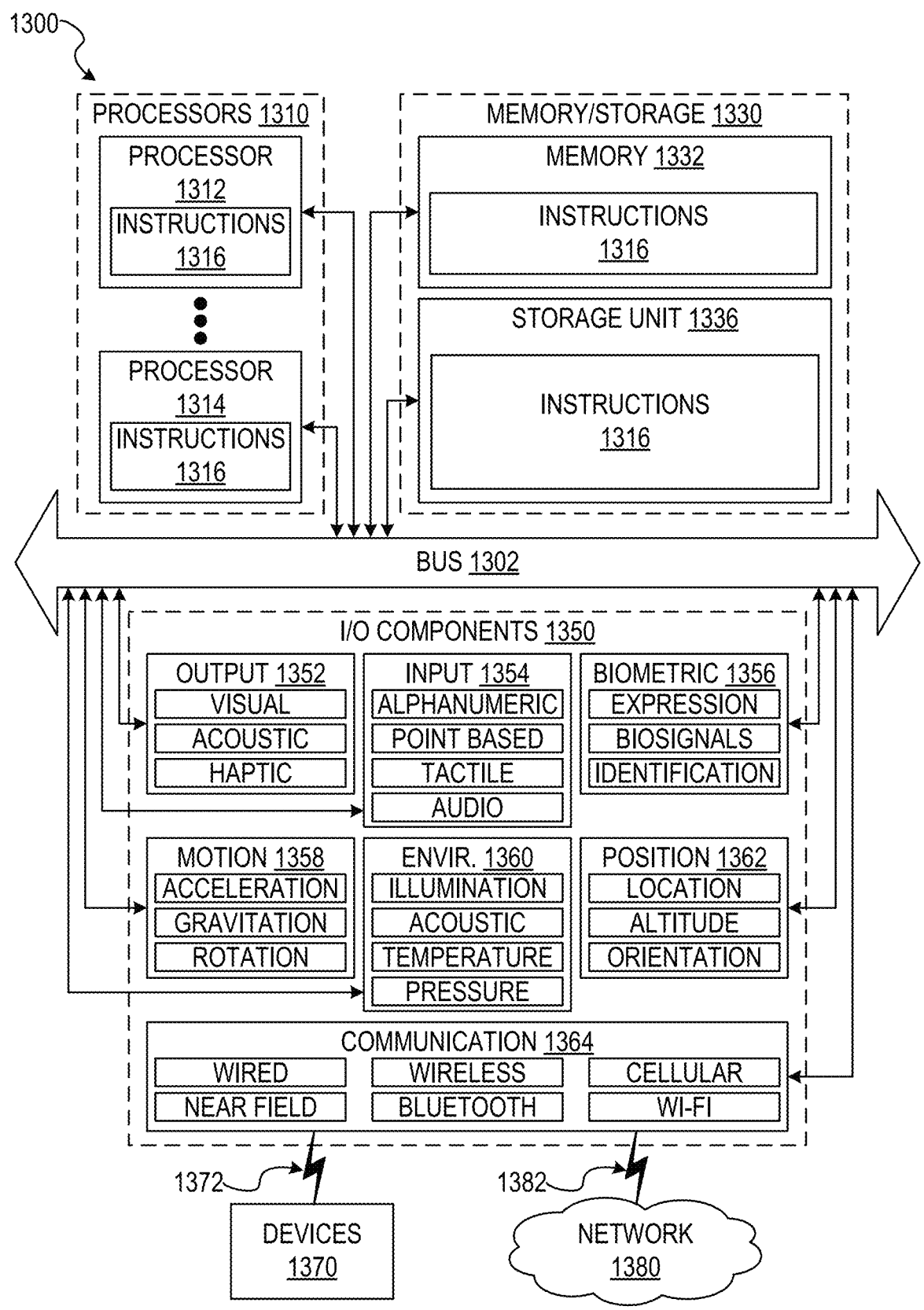
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310 having individual processors 1312 and 1314 (e.g., cores), memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF413, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
    identifying an image depicting an object;
    identifying a generalized three-dimensional (3D) virtual model of the object, the generalized 3D virtual model of the object generated by merging a plurality of 3D models;

generating a 3D virtual model of the object from the generalized 3D virtual model of the object;

generating, using one or more processors of a machine, a refined 3D virtual model of the object by successively generating multiple new 3D virtual models of the object using shape from shading and the image, each new 3D virtual model generated using projected vectors from the image that are projected on the new 3D virtual model, the projected vectors being projections of normal vectors of the new 3D virtual model onto light cones from points in the image, the normal vectors being normal to a surface of the new 3D virtual model, each normal vector and a corresponding light cone onto which the normal vector is projected sharing a same location on the object;

mapping the image as a texture on the refined 3D virtual model of the object;

generating a modified image of the image by applying an image effect to the mapped image; and publishing the modified image as an ephemeral message on a network site.

2. The method of claim 1, further comprising:
generating the projected vectors by projecting each of the normal vectors onto a nearest portion of a corresponding light cone.

3. The method of claim 2, wherein the light cones are generated from magnitude values of image elements in the image.

4. The method of claim 3, wherein the image elements are pixels and the magnitude values are pixel values.

5. The method of claim 1, wherein generating the 3D virtual model comprises aligning a depth factor of the generalized 3D virtual model to the object as depicted in the image.

6. The method of claim 1, wherein the generalized 3D virtual model is generated by merging a plurality of 3D models of a same object type of the object.

7. The method of claim 6, wherein the same object type is a face shape and the generalized 3D virtual model is generated by averaging a plurality of 3D virtual models of face shapes.

8. The method of claim 1, further comprising: generating, using the one or more processors, the image using an image sensor.

9. The method of claim 1, further comprising:
generating the modified image by modifying the image using the refined 3D virtual model of the object.

10. The method of claim 1, wherein the normal vectors are projected using a dot product operation.

11. A system comprising:
one or more processors of a machine; and
a memory storing instructions that, when executed by the one or more processors, cause the machine to perform operations comprising:
identifying an image depicting an object;
identifying a generalized three-dimensional (3D) virtual model of the object, the generalized 3D virtual model of the object generated by merging a plurality of 3D models;
generating a 3D virtual model of the object from the generalized 3D virtual model of the object;
generating, using the one or more processors, a refined 3D virtual model of the object by successively generating multiple new 3D virtual models of the object using shape from shading and the image, each new 3D virtual model generated using projected vectors from the image that are projected on the new 3D virtual model, the projected vectors being projections of normal vectors of the new 3D virtual model onto light cones from points in the image, the normal vectors being normal to a surface of the new 3D virtual model, each normal vector and a corresponding light cone onto which the normal vector is projected sharing a same location on the object;
mapping the image as a texture on the refined 3D virtual model of the object;
generating a modified image of the image by applying an image effect to the mapped image; and
publishing the modified image as an ephemeral message on a network site.

12. The system of claim 11, the operations further comprising:
generating the projected vectors by projecting each of the normal vectors onto a nearest portion of a corresponding light cone.

13. The system of claim 12, wherein the light cones are generated from magnitude values of image elements in the image.

14. The system of claim 13, wherein the image elements are pixels and the magnitude values are pixel values.

15. The system of claim 4, wherein the generalized 3D virtual model is generated by merging a plurality of 3D models of a same object type of the object.

16. A non-transitory machine-readable storage device embodying instructions that, when executed by a machine, cause the machine to perform operations comprising:
identifying an image depicting an object;
identifying a generalized three-dimensional (3D) virtual model of the object, the generalized 3D virtual model of the object generated by merging a plurality of 3D models;
generating a 3D virtual model of the object from the generalized 3D virtual model of the object;
generating a refined 3D virtual model of the object by successively generating multiple new 3D virtual models of the object using shape from shading and the image, each new 3D virtual model generated using projected vectors from the image that are projected on the new 3D virtual model, the projected vectors being projections of normal vectors of the new 3D virtual model onto light cones from points in the image, the normal vectors being normal to a surface of the new 3D virtual model, each normal vector and a corresponding light cone onto which the normal vector is projected sharing a same location on the object;
mapping the image as a texture on the refined 3D virtual model of the object;
generating a modified image of the image by applying an image effect to the mapped image; and
publishing the modified image as an ephemeral message on a network site.

17. The non-transitory machine-readable storage device of claim 16, the operations further comprising:
generating the projected vectors by projecting each of the normal vectors onto a nearest portion of a corresponding light cone.

18. The non-transitory machine-readable storage device of claim 17, wherein the light cones are generated from magnitude values of image elements in the image.

19. The non-transitory machine-readable storage device of claim 18, wherein the image elements are pixels and the magnitude values are pixel values.

20. The non-transitory machine-readable storage device of claim 16, wherein the operations further comprise: generating the modified image by modifying the image using the refined 3D virtual model of the object.

\* \* \* \* \*

UNITED STATES PATENT AND TRADEMARK OFFICE
CERTIFICATE OF CORRECTION

PATENT NO. : 11,164,376 B1  
APPLICATION NO. : 16/116590  
DATED : November 2, 2021  
INVENTOR(S) : Sengupta et al.

Page 1 of 1

It is certified that error appears in the above-identified patent and that said Letters Patent is hereby corrected as shown below:

On the Title Page

On page 3, in Column 1, item (56) under "Other Publications", Line 14, delete "Implemened" and insert --Implemented-- therefor In the Claims In Column 22, Line 25, in Claim 15, delete "claim 4," and insert --claim 11,-- therefor Signed and Sealed this  
Twenty-sixth Day of August, 2025

Coke Morgan Stewart  
*Acting Director of the United States Patent and Trademark Office*